ANGLE-LOCK SIGNAL PROCESSING SYSTEM INCLUDING A DIGITAL FEEDBACK LOOP

Filed May 16, 1966 5 Sheets-Sheet 1

Inventors
PIERRE DEMAN
ANDRÉ LUKASIEWICZ
By Holcombe, Wetherill & Brisebois
Attorneys

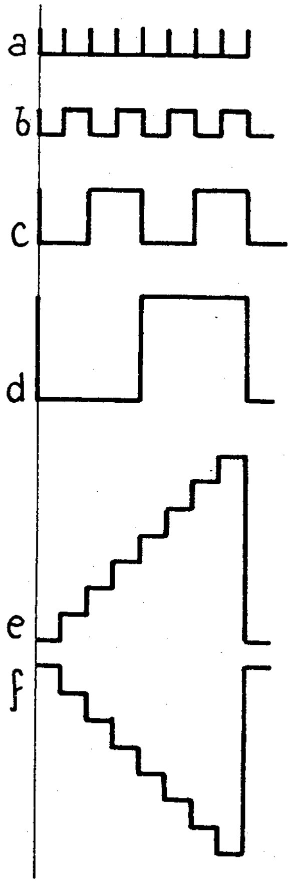
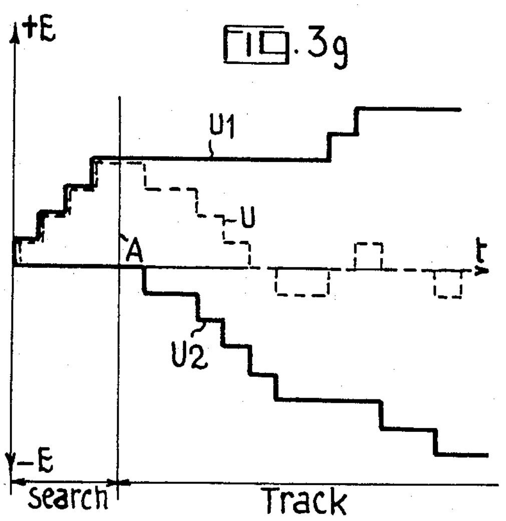
FIG. 3g
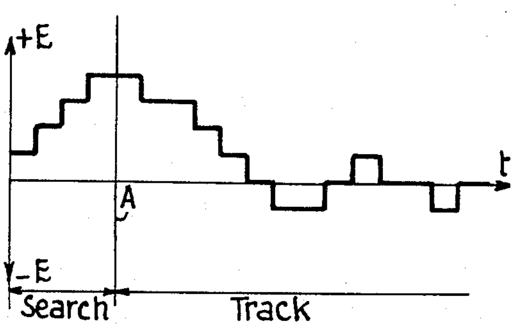
FIG. 3
FIG. 3h
Inventors
PIERRE DEMAN
ANDRE LUKASIEWICZ
By Holcombe, Wetherill & Brisebois
Attorneys Inventors
PIERRE DEMAN
ANDRE LUKASIEWICZ
By Holcombe, Wetherill & Brisebois
Attorneys Inventors
PIERRE DEMAN
ANDRE LUKASIEWICZ
By Holcombe, Wetherill & Brisebois
Attorneys Inventors
PIERRE DEMAN
ANDRE LUKASIEWICZ
By Holcombe, Wetherill & Brisebois
Attorneys

United States Patent Office 3,411,103

Patented Nov. 12, 1968

3,411,103

ANGLE-LOCK SIGNAL PROCESSING SYSTEM INCLUDING A DIGITAL FEEDBACK LOOP

Pierre Deman, Paris, and André Lukasiewicz, Nanterre, France, assignors to Compagnie Francaise, Thomson Houston-Hotchkiss Brandt, Paris, France, a corporation of France Filed May 16, 1966, Ser. No. 550,452

Claims priority, application France, May 21, 1965, 17,889

11 Claims. (Cl. 331—17)

ABSTRACT OF THE DISCLOSURE

In a phase-lock signal receiving system in which a signal received at an antenna (1) is heterodyned in a mixer (2) with a signal from a variable-frequency oscillator (8), the heterodyned signal is applied to one input of a phase discriminator (4) receiving a reference oscillator (5) signal at its other input, and the phase-discriminator error output is then applied by way of a feedback loop to the frequency-varying input of the variable oscillator (8), the invention provides a composite feedback loop having two parallel branches one of which comprises an RC integrating network (6) and the other a digital integrating network (9, 10, 11, 12, 13) generating a quantized staircase voltage which is combined with the output of said RC integrating network (6) in an adding circuit (7) and serves to reduce the error to less than a prescribed level (FIG. 1).

This invention relates to phase-lock and frequency-lock systems, i.e. systems in which an incident signal is applied to a phase discriminator for comparison with a fixed-phase fixed-frequency reference signal, the error output of the discriminator being fed to the frequency-controlling input of a variable oscillator controlling the frequency and phase of the incident signal, in order to "lock" the signal, both in frequency and phase, with the reference signal.

In accordance with well-recognized terminology, the concepts of phase and frequency are included under the generic term of "angle," and system of the general class just specified are accordingly defined as angle-lock systems for the purposes of this specification and claims.

Angle-lock systems are now widely used for the reception of angle-modulation radio and other long-distance communication signals, including space communication links with artificial satellites and spacecraft. In such systems, the received signals may be very weak and are subject to severe interference. Whenever in such a system the combined intelligence modulation and random noise approaches a phase angle of ±90°, the system is liable to "lock in" spuriously with some strong noise burst, the useful signal is then "locked out," and intelligence is lost. It is an object of this invention to provide an improved angle-lock system which will be capable of maintaining correct operation for lower values of input signal-to-noise ratio than was heretofore possible. A related object is to provide means in an angle-lock system for continuously maintaining the error output of the angle-discriminator at a minimal value, or substantially around zero, whereby larger amounts of noise and disturbance signals can be tolerated at the input of the system before the objectionable "lock-out" situation is liable to arise.

In accordance with an important feature of the invention, there is provided in the feedback loop from the phase discriminator to the variable frequency oscillator of an angle-lock system, digital generator means producing an incrementally varying output. The output is varied in one sense, e.g. increases, whenever the error output from the angle discriminator is positive and exceeds a prescribed threshold level, and is varied in the other sense, e.g. decreases, whenever the error output is negative and exceeds a prescribed threshold level in absolute value. When such an incrementally varying output is applied to the frequency-varying input of the variable oscillator, preferably simultaneously with the output of a conventional corrective network (such as an integral RC network) connected in parallel with said digital generator means, the error output will, in steady-state conditions, be at all times maintained less than the selected threshold level. In other words, the digital feedback loop will act to "recenter" the operating point of the system substantially at or around the zero-error condition.

Another object of the invention is to facilitate the operation of angle-lock receiver systems during the initial, so-called search, phase. When the system is first placed in operation, as for tracking a satellite or other transmitter-carrying target, it is customary to apply a continuously varying sweep voltage, usually a sawtooth waveform, to the frequency-controlling input of the variable oscillator, until the oscillator frequency has assumed a value within the frequency band of the target-transmitted signal; at this time an error voltage appears at the discriminator output, and the normal angle-lock process can commence. The digital feedback means of the invention provide a highly convenient method of performing the initial search operation. In the search mode, the digital generator means is controlled to produce an output varying incrementally in a single sense, i.e. increasing or decreasing. Means are described for initially operating the system in this "search" mode, and for then automatically switching to the normal or "tracking" mode under control of the received signal.

Exemplary embodiments of the invention will now be described with reference to the drawings, wherein.

Figure 1:
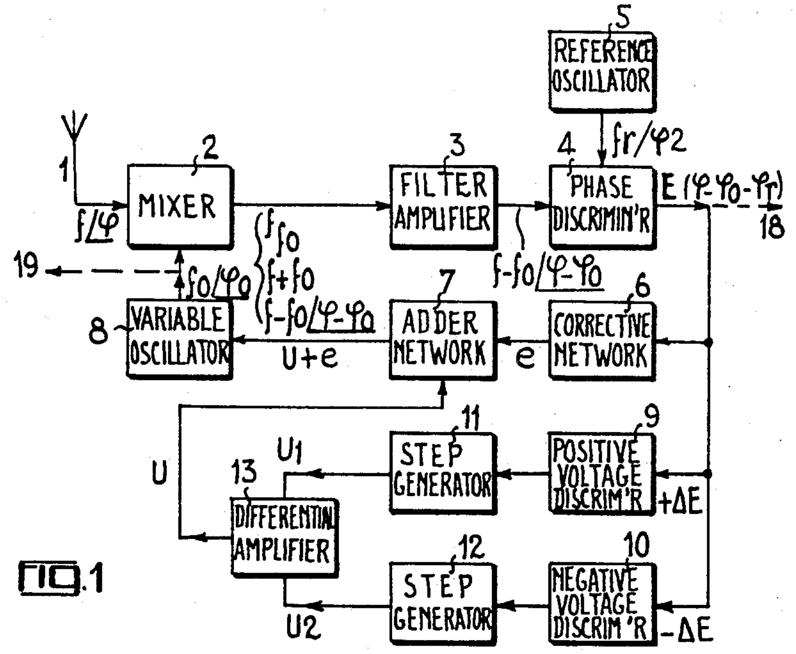
FIG. 1 is a block diagram of one embodiment of a phase-lock receiver system according to the invention.
Figure 2:
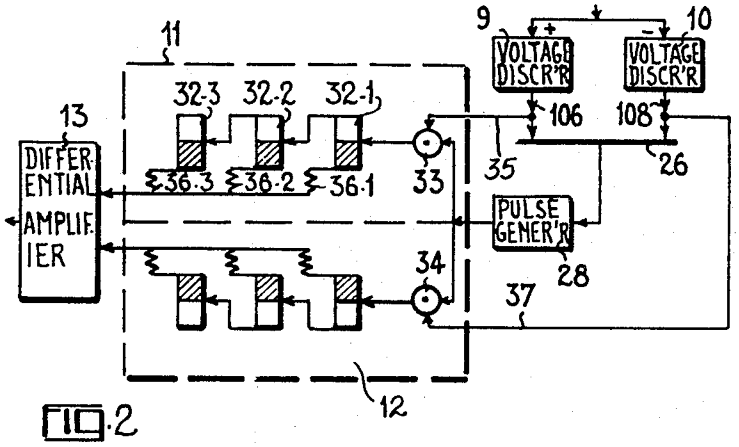
FIG. 2 is a logical diagram showing part of the system of FIG. 1.
Figure 4:
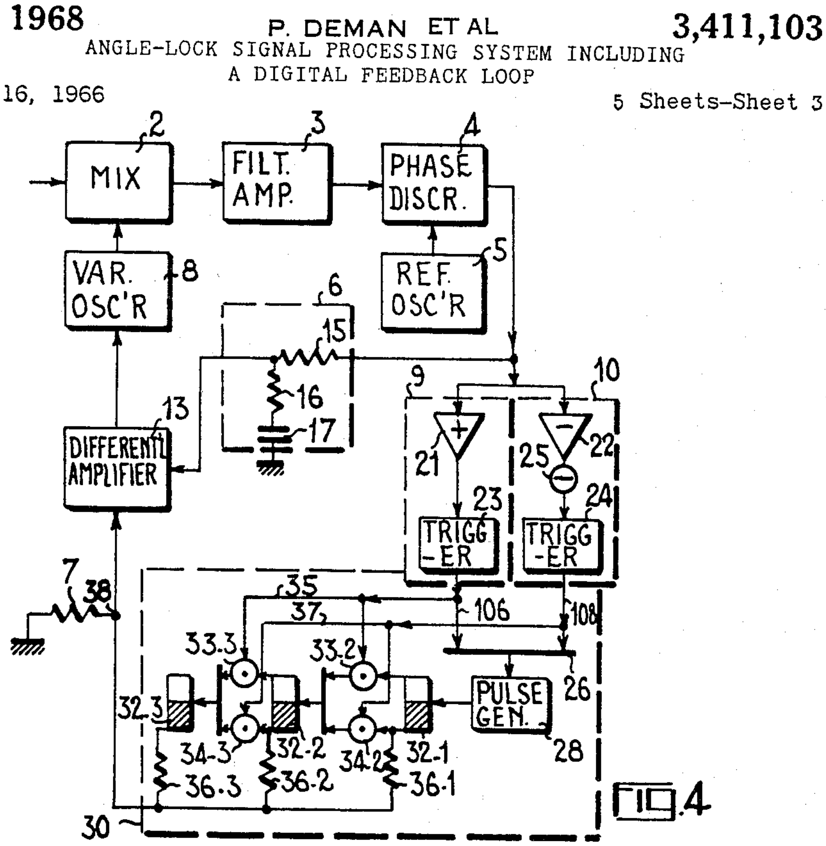
Figure 5:
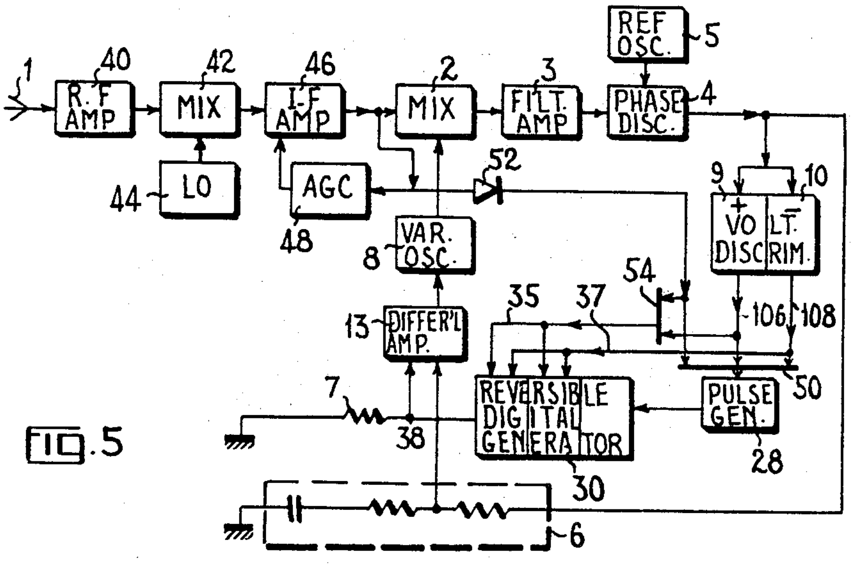
Figure 6:
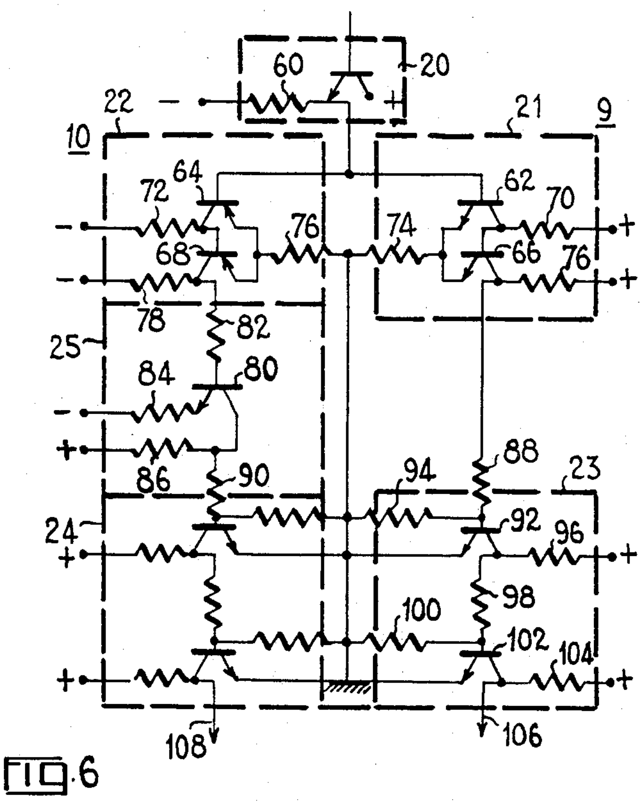
Figure 8:
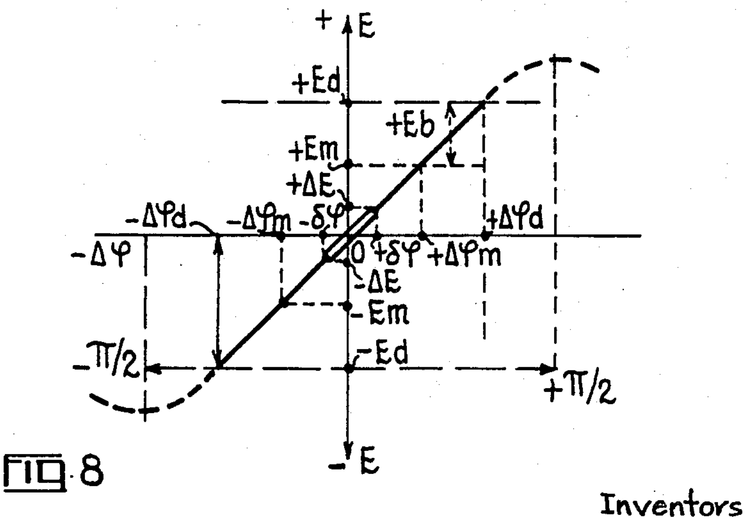
Figure 7:
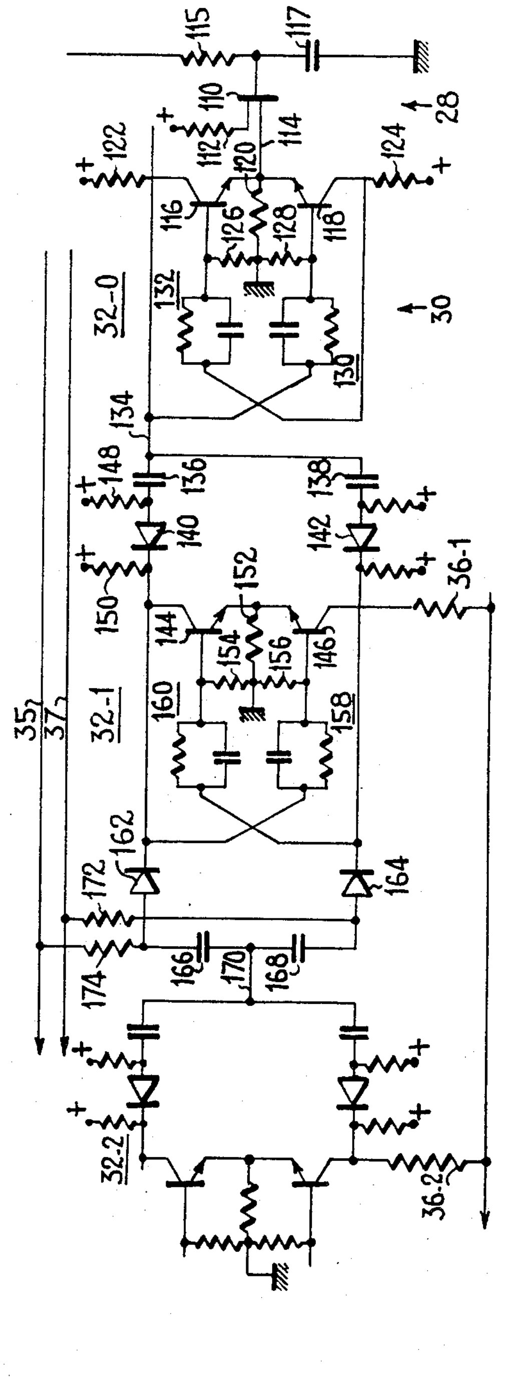

FIGS. 3*a* to 3*f* show a set of idealized voltage waveforms involved in the operation of the systems of the invention;

FIG. 3*g* illustrates typical curves representing output waveforms of the digital generators shown in the system of FIGS. 1 and 2, as well as the resulting output curve from the differential amplifier of the system;

FIG. 3*h* shows a typical curve representing the output waveform of the single reversible digital generator used in the systems of following figures;

FIG. 4 is a functional diagram of another embodiment of the invention using a single reversible digital counter;

FIG. 5 illustrates an arrangement for automatically switching from "search" to "track" operating mode, as applied to the system of FIG. 4;

FIG. 6 is a detailed circuit diagram of one embodiment of a dual voltage discriminator arrangement usable in the systems of FIGS. 1, 2, 4 and 5;

FIG. 7 is a detailed circuit diagram of part of the reversible counter usable in the systems of FIGS. 4 and 5; and FIG. 8 is a graph illustrating error voltage versus phase angle, and serving to explain advantages of the invention.

The phase-lock receiver system schematically illustrated in FIG. 1 is shown as including an antenna 1 for receiving phase or frequency modulated radio signals. It is to be understood that the invention is applicable to communications systems using other than radio links, and that the antenna 1 is shown merely as one example of suitable signal input means. The input signals are assumed to be of a carrier frequency $f$ and a modulated, variable phrase $\phi$. Such signals are herein symbolically designated as $f/\underline{\phi}$.

The input signals from antenna 1 are applied to one input of a heterodyne mixer 2, the mixer receiving at its other input the output from a local oscillator 8 which delivers variable-frequency and variable-phase signals $f_0/\underline{\phi_0}$. The mixer delivers a heterodyned signal having a resulting frequency, the difference of the frequencies applied to the mixer inputs, and a resulting phase the difference of the phases of the applied signals. This heterodyned signal can be represented as $$\pm(f-f_0)\underline{/(\phi-\phi_0)}$$

the plus-and-minus sign indicating that the resulting mixed signal can have one or the opposite phase condition. The mixed signal is passed through a filter-amplifier circuit 3 in which spurious frequency components of the values $f$, $f_0$ and $(f+f_0)$ are eliminated, and the filtered fundamental component, of frequency $(f-f_0)$, is amplified.

The amplified filtered signal from circuit 3 is applied to one input of a conventional phase discriminator 4 which receives at its other input a reference signal $f_R/\underline{\phi_R}$ delivered by a stable oscillator 5, such as a crystal oscillator. The phase discriminator 4 delivers a variable D-C voltage corresponding in polarity to the sense of the instantaneous phase displacement $(\phi-\phi_0)-\phi_R$ of the signals applied to the inputs of the discriminator, and corresponding in magnitude to the magnitude of that difference. This variable D-C voltage delivered by phase discriminator 4 constitutes an error signal that is applied to the frequency-controlling input of local oscillator 8 by way of a composite feedback loop or network constructed in accordance with this invention and presently described. It is understood that as in any receiver system of the phase-lock class to which this invention generally relates, the purpose of the feedback loop is to control the output frequency of variable oscillator 8 in such a manner as to reduce the error signal E from discriminator 4 continuously to zero, and thereby maintain the mixed signal $(f-f_0)/\underline{\phi-\phi_0}$ from filter 3 continuously equal in frequency and phase, with the frequency and phase of the reference signal $f_R/\underline{\phi_R}$ from reference oscillator 5, so that $f-f_0=f_R$, and $\phi-\phi_0\phi_R$.

The feedback network extending from the output of phase-discriminator 4 to the frequency controlling input of oscillator 8 includes a first network branch comprising a conventional corrective network 6 of the well-known integral type later described in detail. The output of integral network 6 is shown connected to the frequency controlling input of local oscillator 8 by way of an adder network 7 for reasons that will later appear. The function of the integral corrective network 6 is per se well-known. It is a phase-lag network having a transfer function so predetermined as to modify the frequency response of the feedback signal passed through it in such a manner as to maintain the stability of the servo-system throughout a predetermined range of operating frequencies.

The operation of the circuit as so far described is that of a conventional phase-lock system. In the steady state the filtered signal derived from filter-amplifier 3 has a frequency and phase that are equal to the frequency and phase of stable oscillator 5 and the error voltage signal E from discriminator 4 is zero. The variable oscillator 8 then delivers an output whose frequency and phase are equal to the difference between the frequencies and phases, respectively, of the input signal received at antenna 1 and the reference signal produced by stable oscillator 5. Should the frequency and/or phase of the received signal depart from their steady-state values for any reason, the phase discriminator 4 produces a corresponding error voltage and this is applied through corrective network 6 (and adder network 7) to the variable oscillator 8. The output frequency of oscillator 8 will then be varied in the proper sense and by the proper amount to restore a new steady-state equilibrium condition in which the error signal is again zero.

It will be understood that the useful output from such a phase-lock system can be derived from more than one point depending on requirements. If the purpose is to derive intelligence contained in the form of frequency or phase modulation in the received signal, then this can be derived in the form of the error voltage E by means of an output line 18 connected to the output of discriminator 4. If on the other hand the object of the system is to eliminate a random frequency shift from the incident signal, as described e.g. in the copending French application No. 17,890 filed May 21, 1965, then such constant-frequency output may be derived from the output of variable-oscillator 8 as indicated by connection 19.

The proper operation of a phase-lock circuit as described up to this point requires that the error signal delivered by phase discriminator 4 shall not exceed a certain value. Specifically, the phase displacement between the amplified filtered signal $(f-f_0)/\underline{\phi-\phi_0}$ and the reference signal $f_R/\underline{\phi_R}$ should not approach an angular value of plus or minus 90°, since otherwise the phase-lock condition is liable to be lost, the system locking in on some spurious noise signal component for a non-negligible period of time, and during such spurious phase-lock periods intelligence is lost.

Such a situation quite frequently arises in phase-modulation communication systems and has set a lower limit to the permissible input signal-to-noise ratio. The situation becomes quite inacceptable with long-distance communications as when receiving very weak signals transmitted from satellites or spacecraft that may be located at great distances from the receiver and subject to considerable disturbance. Moreover, in such space communication systems there is an additional cause that is liable to increase the phase error signal to a level beyond that at which the signal-lock-out condition described above can occur. This cause resides in the considerable amount of Doppler shift that may affect the incoming signal frequency whenever the satellite or spacecraft has a high radial velocity component, that is, a component of rapid motion directly towards or away from the receiver station. In view of the high flight velocities of space vehicles, the Doppler shifts can attain absolute values as high as ±3000 c.p.s. or more. Also, the transmitter frequencies are liable to substantial amounts of drift due to aging and other reasons. All these and other causes combine to increase the likelihood of a signal lock-out condition occurring, and further lower the reception threshold of the system.

In accordance with the present invention, such a condition is prevented from arising through the provision of improved means, forming part of the feedback loop of the phase-lock system, for at all times reducing the error signal produced by the phase discriminator to less than a prescribed amount; or, in other words for at all times "recentering" the operating point of the system to a point very close to its optimum or zero-error operating state.

As shown in FIG. 1, the error voltage signal E from phase discriminator 4, at the same time as it is applied to the conventional corrective network 6, is also applied in parallel to the inputs of two voltage discriminator circuits 9 and 10. These circuits are of a conventional type, producing no output voltage therefrom so long as the input voltage applied to the circuit is less than a prescribed low voltage level. The circuits 9 and 10 operate in such a way that when the input signal applied to both circuits in parallel is positive and exceeds a prescribed threshold level in absolute magnitude, circuit 9 produces an output, whereas when the input signal is negative and exceeds the prescribed threshold level in absolute magnitude, circuit 10 produces an output. Exemplary circuit diagrams suitable for use as the voltage discriminators 9 and 10 will be later disclosed.

The voltage discriminators 9 and 10 have their outputs connected to the inputs of respective digital generators 11 and 12, later described in detail. Each of generators 11 and 12 operate, in response to an output applied to it from the related voltage discriminator 9 or 10, to generate an output voltage that rises incrementally, in steps of fixed magnitude. So long as the phase discriminator 4 produces a positive or negative error voltage that is smaller in absolute value than a prescribed threshold level, neither of the voltage discriminators 9 and 10 produces an output, so that the outputs from both generators 10 and 11 retain their previous values. Should a positive error voltage larger than the prescribed threshold appear, the output from generator 11 increases by one step or increment, whereas should a negative error voltage larger in absolute value than the threshold appear, then the output from generator 12 increases by one step.

The quanticized voltage outputs produced by step generators 11 and 12 are applied to the respective inputs of a conventional differential amplifier 13, so that the amplifier produces at its output an incrementally varying voltage that is at all times equal to the difference of the absolute values of (i.e. is the algebraic sum of) the quanticized outputs of both generators. This differential, quanticized voltage is applied to the second input of the adder network 7 so as to be combined therein with the analog error voltage applied from the corrective network 6. The algebraic sum of the analog and digital error voltages appearing at the output of adder network 7 is applied to the frequency-controlling input of variable oscillator 8 to control the output frequency thereof as earlier described.

FIG. 2 illustrates the digital step generators 11 and 12 and the manner in which they are controlled from the voltage discriminators 9 and 10 in greater detail. Each step generator comprises a scale-of-two counter comprising a number of bistable (flipflop) stages. While only three stages per counter are here shown, more would generally be used, for example seven stages. Each of the flipflop stages, such as 32–1, 32–2, 32–3, has a single input and two outputs. One of the outputs of each stage other than the last is connected to the single input of the next stage. The initial stage input of each counter is connected to the output of an AND-gate 33 and 34 respectively. The AND-gates have first (enabling) inputs connected to the outputs of voltage discriminators 9 and 10 respectively by lines 35 and 37, and have second inputs connected in common to the output of a pulse generator 28. Pulse-generator 28 has an enabling input which is connected by way of an OR-gate 26 to the outputs 106, 108 of both voltage discriminators.

One of the two outputs of each stage of each counter is connected to an output resistances 36–1, 36–2, 36–3. In each counter, the resistance associated with the respective stages have different resistance values that are substantially in a geometric progression of ratio ½. In other words, resistance 36–2 is one half resistance 36–1, resistance 36–3 is one half resistance 36–2, and so on in case of more than three counter stages. All of the output resistances of each counter are connected in common to a related one of the two inputs of differential amplifier 13.

In operation, let us assume that positive voltage discriminator 9 has its output 106 energized because phase discriminator 4 is producing a positive error voltage greater than the threshold value. The output is applied through OR-gate 26 to the enabling input of pulse generator 28, which thereupon generates a pulse train of narrow pulses at a prescribed repetition rate (e.g. about 5000 c.p.s.), as indicated on line *a* of FIG. 3. Simultaneously, the output from positive voltage discriminator 9 is applied by line 35 to the enabling input of AND-gate 33, so that the pulses are passed serially to the input of the first stage of counter 11. The pulses cause the first-stage binary 36–1 to switch between its two states at a corresponding rate, so that each of the outputs of the stage produces a rectangular or square voltage wave at a cycle period twice the generator pulse interval. The square wave appearing at one input of binary 32–1 is applied through output resistor 36–1 to differential amplifier 13. The voltage wave applied through first stage output resistor 36–1 is indicated in line *b* of FIG. 3. The amplitude of the square pulses shown is determined by the value of resistor 36–1.

The voltage appearing at the other output of first-stage binary 32–1 is applied to the input of second-stage binary 32–2, so that the latter is switched between its two states at a rate twice as low as that of the first-stage binary in accordance with well-known scale-of-two counter operation. The output voltage appearing at one output of binary 32–2 is applied to differential amplifier 13 through resistor 36–2, and since this resistor is one half the value of first resistor 36–1, it is evident that the square waveform applied to the differential amplifier from the second stage, which waveform is shown in line *c* of FIG. 3, has an amplifier twice that of the square waveform, shown in line *b*, applied to said differential amplifier from the first-stage output resistor 36–1.

Similarly the third-stage output resistor 36–3 applies to the same input of differential amplifier 13 a square waveform as shown in line *d* of FIG. 3, having a frequency rate twice as low, and an amplitude twice as large, as the voltage waveform applied through the second-stage resistor. In this manner, the voltage outputs from all the counter stages of step generator 11, "weighted" in accordance with the successive terms of the geometric progression of ratio 2, are all applied to the same input of the differential amplifier.

It can readily be shown that with the type of counter operation just described, the resultant voltage applied by all the stages of counter 11 to the related differential amplifier input, will have the "staircase" form shown in line *e* of FIG. 3. The resultant waveform has a total cycle period equal to that of the output waveform, line *d*, of the lowest counter stage (here 32–3), and has a total amplitude or voltage sweep approximately twice that of said lowest-stage output waveform. If $n$ is the number of counter stages used, the staircase waveform includes $2^n$ steps.

Assuming now that the error voltage output from phase discriminator 4 is negative rather than positive, and again is greater in absolute value than the prescribed threshold values, then negative voltage discriminator 10 produces an output, and this is applied by OR-gate 26 to enable the pulse generator 28, and is also applied over line 37 to enable the AND-gate 34. In this case, the scale-of-two counter 12 is operated in the same manner as was counter 11 in the first described instance, and the voltage applied to the lower (or negative) input of differential amplifier 13 is of a similar staircase shape as the waveform shown in line *e* of FIG. 3. Since however the two inputs to differential amplifier 13 have reverse-polarity actions, the output waveform of lower generator 12 may be represented by the reverse staircase waveform shown in line *f* of FIG. 3.

The output waveforms such as *e* and *f* are obtained in the case that an energizing signal is continuously present at the output of one or the other of voltage discriminators 9 and 10, that is, if a phase error voltage of constant sign is present at the output of phase discriminator 4 and of a magnitude constantly greater than the prescribed minimum. During actual tracking operation of the system, the counters 11 and 12 will alternately produce upgoing and downgoing voltage steps respectively, interspersed with idle periods wherein neither counter produces an output because the phase error is less than the prescribed threshold. Curves U1 and U2 of FIG. 3*g* represent exemplary outputs of the two generators 11 and 12 for a typical operating period of the system, as a function of time. Curve U, which is the difference between curves U1 and U2, represents the output of the differential amplifier 13.

This differential output is combined as earlier explained with the modified analog error voltage from integral network 6, and is applied to the frequency-controlling input of variable oscillator 8 to maintain the oscillator output at a frequency value very close to the prescribed value, so that the phase excursions about this value will at no time exceed a prescribed minimum.

In the embodiment of the invention partly shown in FIG. 4, components designated by the same numerals as in FIGS. 1 and 2 have corresponding functions. The corrective network 6 is here shown in detail as consisting of a series resistor 15 followed by a shunt branch including a resistor 16 and capacitor 17 in series, connected to ground.

Each voltage discriminator 9 and 10 is shown as including an amplifier 21 and 22 followed by a Schmitt trigger 23 and 24. The Schmitt triggers are identical, whereas amplifiers 21 and 22 differ in that one, 21, responds only to positive voltages applied thereto while the other amplifier 22 only responds to negative applied voltages. The negative-response amplifier 22 is followed by an inverter or complementer circuit 23 which serves to convert the negative amplifier voltage to positive before application to the associated Schmitt trigger 24. A detailed circuit schematic of the parts 21–25 is later described. The outputs of both Schmitt triggers are applied by way of lines 106 and 108 and OR-gate 26 to the enabling input of pulse generator 28. The output of generator 28 is applied to the first stage of a single, reversible up-and-down counter 30, that replaces the two distinct generators or counters shown in FIGS. 1 and 2.

Counter 30 is a scale-of-two counter having its stages intercoupled through gating means so that the counter will count positively or "up" if an input is produced by the positive trigger 23, and will count negatively or "down" if an output is produced by negative trigger 24. The counter stages, designated 32–1 through 32–3, are essentially similar to those shown in FIG. 2. The first stage 32–1 has its input connected to the output of pulse generator 28 and has its two outputs connected to first inputs of respective AND-gates 33–2 and 34–2, that have their second inputs connected through control lines 35 and 37 to the outputs of triggers 23 and 24 respectively. The outputs of AND-gates 33–2 and 34–2 are applied by way of an OR-gate to the single input of the second-stage binary 32–2. A similar arrangement is associated with the input of each of the stages of the counter 30 following the first stage.

The lower, or "reset," output of each of the binary stages is connected to an output resistor 36–1 through 36–3, the resistors having their opposite ends connected in parallel to the junction 38 which constitutes the first input of differential amplifier 13. Junction 38 is connected to ground by way of a resistor 7 which constitutes the adding network designated 7 in FIG. 1. The output of integral network 6 is connected to second input of differential amplifier 13. The output of the differential amplifier 13 is connected to the input of variable oscillator 8.

Resistors 36–1 through 36–3 have resistance values that are substantially in a geometric progression of ratio ½.

Assume phase discriminator 4 is producing a positive error voltage larger than the prescribed threshold level as determined by the adjustment of Schmitt triggers 23 and 24. The positive error voltage is amplified in positive-sensing amplifier 21, and operates Schmitt trigger 23, whose output is thereupon energized. The trigger output is applied through line 35 to the upper inputs of all the upper AND-gates such as 33–2, enabling the gates. The trigger output is likewise passed through OR-gate 26 to the enabling input of pulse generator 28, which begins to produce pulses at a determined rate. Counter 30 then functions in the manner described for counter 11 in FIG. 2, to produce at common junction 38 a resulting voltage having the "staircase" shape shown in line *e* of FIG. 3.

Assuming now that the error voltage from phase discriminator 4 is negative and greater in absolute value than the operating threshold of the Schmitt triggers, trigger 24 produces an output and this is applied over line 37 to the enabling inputs of the lower AND-gates such as 34–2, at the same time as it is applied through OR-gate 26 to the pulse generator 28. The output applied to junction 38 will now be a staircase waveform of reverse sense, as shown in line *f* of FIG. 3.

During tracking operations, the up-and-down counter 30 will be controlled by the outputs from the respective triggers 23 and 24 so as to alternate between limited periods of up-counting and down-counting interspersed with idle periods when its output retains the previous step value. The resulting voltage applied by counter 30 to junction 38 will then have the general appearance indicated by the curve of FIG. 3*h*, similar to curve U of FIG. 3.

As earlier indicated, it is convenient to provide means operative during an initial "search" phase of system operation, to cause the digital generator means of the invention to produce a staircase voltage increasing continually in a given sense until a true error signal has been acquired, after which the reversible type of operation described above will set in. FIG. 5 illustrates an embodiment of the invention including automatic means for the purpose just described.

In the system of FIG. 5 parts designated by the same numerals as in FIGS. 1, 2 and 4 have the same functions as in those figures. Comparing FIG. 5 with FIG. 1, it will be seen that between the receiving antenna 1 and the mixer 2 there are interposed conventional units of a radio receiving system, namely an R-F amplifier 40 followed by a mixer 42 for heterodyning the amplified R-F signal with the output of an intermediate-frequency local oscillator 44, and an I-F amplifier 46 for amplifying the intermediate-frequency signal prior to application to mixer 2. The I-F amplifier 46 is provided with a conventional automatic gain control circuit 48 by way of which the amplifier output is fed back to a gain-varying input of the amplifier.

In FIG. 5, the two outputs of the positive and negative voltage discriminator unit 9–10 (which may be constructed as in FIG. 4 and as further described later) are applied to two of the inputs of a three-input OR-gate 50 that replaces the two-input OR-gate 26 of FIG. 2 or 4, the output of OR-gate 50 being applied to the enabling input of pulse generator 28. The third input of OR-gate 50 is connected through a suitably-poled rectifier diode 52 to the output of I-F amplifier 46 in the input signal chain. It will be noted that in FIG. 5, whereas line 37 controlling the lower inter-stage coupling AND-gates (such as 34–2 in FIG. 4, not here shown), is connected to the output 108 of negative voltage discriminator 10 directly, as in FIG. 4, the line 35 controlling the upper inter-stage coupling AND-gates (such as 33–2 in FIG. 4) are applied to the output 106 of the positive voltage discriminator 23 by way of OR-gate 54, which has its other input connected to diode 52 in parallel with the third input of OR-gate 50. The system operates as follows.

When the system is first put into operation and no useful signal is being received at antenna 1, the AGC circuit 48 is inoperative and a substantial amount of noise is present at the output of I-F amplifier 46. Due to this high noise level, diode 52 is rendered conductive, and applies a voltage to both OR-gates 50 and 54. The voltage applied through OR-gate 50 actuates pulse generator 28 which starts to produce a pulse train in accordance with line *a* of FIG. 3. The voltage applied to OR-gate 54 energizes the upper AND-gate control line 35 enabling all of the upper interstage coupling AND-gates 33 (FIG. 4). The up-and-down counter 30 then operates to produce a unidirectionally varying staircase voltage of the kind shown in line *e* of FIG. 3. This is the initial, "search," phase of operation of the system, and is indicated in FIGS. 3*g* and 3*h* as the period extending from time zero to time period A. During the search period, it will be understood that the feedback loop of the phase-lock receiving system is, in effect, open, the output frequency from variable oscillator 8 is continuously increasing (or continuously decreasing), and no error output is produced from phase discriminator 4. Assuming a useful signal, such as a signal transmitted from a satellite, is received at antenna 1, the AGC circuit 48 operates to cause a sharp reduction in the amount of noise present at the output of amplifier 46. The diode 52 becomes non-conducting, and no longer applies an energizing voltage through gates 50 and 54 to pulse generator 28 and to AND-gate enabling line 35. However, the useful signal now present results in the appearance of a phase error signal at the output of phase discriminator 4, and such error signal is operant by way of the voltage discriminators 9 and 10 to actuate pulse generator 28 and energize one of the AND-gate enabling lines 35, 37, causing the up-and-down operation of the digital counter 30 in the way earlier described herein. This is the "tracking" mode of operation of the system, earlier described and indicated in FIGS. 3*g* and 3*h* as starting at the time instant A.

Certain components used in the systems of the invention will now be described in detail.

FIG. 6 illustrates a practical embodiment of the voltage discriminator section of the system. A separator or decoupler stage 20 consists of an NPN transistor having the error signal from phase discriminator 4 applied to its base, its collector connected to a positive polarity source (e.g. +24 v.) and its emitter connected to a negative polarity source (e.g. −24 v.) through a resistor 60, said emitter constituting the output of the stage. This output is applied in parallel to the bases of two transistors 62 and 64 which constitute the input stages of the positive and negative responsive amplifiers 21 and 22 (FIG. 4). Each amplifier further includes a second transistor 66 and 68, having its emitter connected to the emitter of the first-stage transistor, and its collector constituting the stage output. In the positive amplifier 21, the two transistors 62 and 66 are NPN transistors, whereas the transistors 64 and 68 constituting the negative amplifier 22 are PNP transistors. The collector of 62 and the base of 66 are connected together and through a resistor 70 to positive polarity whereas the collector of 64 and base of 68 are connected together and through resistor 72 to negative polarity. The emitters of transistors 62 and 66 are earthed through a resistor 74 and the emitters of 64 and 68 are earthed through resistor 76. The collectors of 66 and 68 are connected through resistors 76 and 78 to positive polarity and negative polarity respectively.

Since the transistors 62 and 66 of amplifier 21 are NPN type whereas the transistors 64 and 68 are PNP type, it will be understood that with a suitable choice of the various biassing resistance values a positive D-C voltage applied from phase discriminator 4 through separator stage 20 to both amplifiers will only be passed in amplified form through the transistors 62 and 66 of amplifier 21, whereas a negative D-C voltage applied through separator stage 20 to both amplifiers will only be passed in amplified form through amplifier 22. The output from amplifier 21 is applied to Schmitt trigger circuit 23 directly whereas the output from amplifier 22 is first applied to an inverter stage 25 as earlier indicated. Inverter 25 comprises an NPN transistor 80 having its base connected through a resistor 82 to the collector output of transistor 68. Transistor 80 has its emitter connected to negative polarity through a resistor 84 and has its collector, which delivers the inverted output, connected to positive polarity through a resistor 86.

In operation, a negative voltage applied to the base of PNP transistor 64 renders the transistor more conductive, and its collector voltage therefore becomes less negative. The base of PNP transistor 68 thereupon becomes less negative and the transistor becomes less conductive so that its collector voltage becomes more negative. Thus, the negative input voltage applied to amplifier 22 produces an amplified negative output voltage at the input of inverter 25. The negative voltage renders NPN transistor 80 less conductive, and is thereby converted into a corresponding positive voltage at the collector of inverter amplifier 80.

The output from positive amplifier 21, and the output from inverter 25, are applied to the Schmitt trigger circuits 23 and 24 through the input resistors 88 and 90 respectively. Each Schmitt trigger comprises a first NPN transistor 92 having its base connected to the input resistor 88 or 90, and connected to ground through a resistor 94. The transistor has its emitter earthed and its collector connected to positive polarity through a resistor 96 and connected to earth through the resistors 98 and 100 in series. The voltage appearing at the junction of resistors 98 and 100 is applied to the base of a second NPN transistor 102 having its emitter earthed and having its collector connected to positive polarity through a resistor 104, said collector constituting the output of the trigger circuit. The operation of such a Schmitt trigger is well-known. Each trigger circuit 23 and 24 is unresponsive to the application of a positive input voltage less than a prescribed threshold value as determined by the selection of the voltage-dividing resistances in conjunction with the operating parameters of the transistors 92 and 96. When the positive input voltage exceeds the threshhold value, the trigger circuit produces at its output a positive voltage of fixed magnitude, as determined chiefly by resistor 104.

In sum, therefore, it is seen that the circuit shown in FIG. 6 operates in response to a phase error voltage applied to its input and exceeding in absolute value a prescribed threshold level, to produce a positive output voltage of fixed magnitude on either of its output lines 106 or 108, according as said input error voltage was positive or negative. If the input error voltage was less than the prescribed threshold level in absolute value, neither of the two output lines produces an output.

FIG. 7 illustrates the pulse generator 28 and part of the up-and-down counter 30. Generator 28 comprises a unijunction transistor 110 having one of its electrodes connected to positive polarity through a resistor 112 and its other terminal constituting the pulse output line 114. Signals from the output of OR-gate 26 (FIG. 4) or the output of OR-gate 50 (FIG. 5) are applied to the base of the unijunction transistor through a resistor 115 and said base is grounded through a capacitor 117. The operation of such a unijunction pulse generator is conventional, and it is known that on application of a positive voltage to the base of the unijunction transistor by way of the RC circuit 115–117, the generator will operate to produce a train of sharp pulses (such as shown in line *a* of FIG. 3) at a rate determined by the RC network constants.

The pulse train appearing at generator output 114 is applied to the initial binary stage of generator 30. In this particular embodiment the initial binary stage of the generator is a preliminary or shaping stage, and its output is not used in the manner earlier described for the generator stages. The initial stage, designated 32–0, is a conventional bistable flipflop circuit including the two transistors 116, 118 having their emitters interconnected and connected to the pulse output line 114, as well as being connected to ground through a low-resistance resistor 120. The collectors are connected to positive battery (e.g. +24 v.) through resistors 122, 124, and the bases are connected to ground through resistors 126, 128. The collector of each transistor is cross-connected to the base of the other transistor through a parallel RC network 130 and 132. The operation of such a bistable circuit is well-known. At each pulse applied to the circuit input from pulse line 114, the circuit switches from one to the other of its stable states, in each of which the collector of one of the two transistors 116, 118 is at a high positive voltage and the collector of the other transistor is at a low positive voltage. In the initial stage 32–0, only the output from one collector, that of transistor 116, is tapped to provide the first stage input line 134.

This single input is applied from line 134 by way of the condensers 136, 138 in parallel, and diodes 140, 142 to the collectors of the transistors 144, 146 of the second bistable circuit of the counter, constituting the first effective counting stage and for that reason designated 32–1. Each of the diodes 140, 142 is reverse-biassed from positive polarity by means of resistors 148 and 150, resistor 148 being somewhat larger in value than resistor 150. The transistors 144 and 146 have their emitters connected in common and grounded through a low resistance 152, and have their bases grounded through resistors 154 and 156. The collector of each transistor is connected to the base of the other transistor through an RC parallel network 158, 160.

In the operation of this binary circuit, it can be assumed that at a given time transistor 144 is non-conductive and transistor 146 is conductive in the absence of a voltage applied from line 134. Since 144 is non-conductive, its collector terminal is at a high positive potential through resistor 150, while the collector of 146 is at a low potential. Diode 140 is therefore reverse-biassed and non-conductive while diode 142 is forward-biassed and hence conductive. The application of a common positive voltage from line 134 through the capacitors 136 and 138 produces a positive pulse which is passed only by the conductive diode 142 not by the reverse-biassed diode 140. The positive pulse passed by diode 142 is applied through RC network 160 to the base of transistor 144, rendering the latter conductive, and the resulting negative voltage transition appearing at the collector of 144 is applied through RC network 158 as a negative pulse to the base of 146, rendering the latter transistor non-conductive. The binary circuit 32–1 is thus switched from one to the other of its stable states.

The output lines of the counter stage, connected to the collectors of transistors 144 and 146 have diodes 162 and 164 connected therein, and are connected through the capacitors 166 and 168 to the common line 170 forming the input of the next counter stage 34–2. The diodes 162 and 164 are poled so that they normally cannot conduct positive voltages from the collectors of the transistors 144, 146 towards second-stage input line 170, but are connected through respective resistors 172, 174 to the control lines 35 and 37, so that a positive voltage applied to one or the other of said control lines will render the related diode 162 or 164 conductive. It will be seen that the diodes 162 and 164 associated with the resistors 172 and 174, constitute the respective AND-gates represented as 33 and 34 in FIG. 4. Thus, when one of the control lines 35 or 37 is positively energized from the output of the associated voltage-discriminator 9 or 10 (FIG. 4), or from the OR-gate 54 (FIG. 5), the related diode 162 or 164 will pass the high positive voltage from the energized transistor collector, through the associated capacitor 166 or 168 in the form of a positive voltage pulse to the second stage input line 170.

The second stage 34–2 partly shown in FIG. 7, as well as all additional stages of the counter 30, are constructed similar to stage 34–1 just described. The output resistors 36–1, 36–2, etc., are shown connected to the collector of the lower transistor, such as 146, in each counter stage. As earlier indicated, these output resistors have decreasing resistance values from the first to the last counter stage substantially in accordance with a geometric progression of ratio ½. The counter constructed as thus described will operate, when either enabling line 35 or 37 is continuously energized, to generate a staircase waveform of the kind shown in line (*e*) or (*f*) of FIG. 3, as earlier explained. When the control lines 35 and 37 are alternately energized in response to a reversible phase error voltage from phase discriminator 4, the counter will operate to generate a step-wise varying output of the kind shown in FIG. 3*h*, so as to "recenter" the feedback loop and maintain at all times the phase error at very nearly zero value.

The advantages of the invention may perhaps be better appreciated with reference to FIG. 8. The curve represents the phase error voltages E as a function of phase error angle $\Delta\phi$ in a conventional phaselock system such as the system of FIG. 1 wherein the digital feedback loop of the invention is omitted. The phase error angle $\Delta\phi$ represents the difference between the phases of the signals at the inputs of phase discriminator 4, $\Delta\phi=(\phi-\phi_O)-\phi_R$. For phase error angles $\Delta\phi=\pm\Delta\phi_d$, the value $\Delta\phi_d$ being somewhat smaller than 90°, the error voltage E reaches a value $\pm E_d$ such that the system is no longer able to control the phase of the signal in a stable manner, so that a condition of "phase lock-out" (or noise "lock-in") can occur. This means that if the system operates with a phase error angle of $\pm\Delta\phi_m$, the maximum amount of noise and disturbance voltage that can be tolerated for proper operation of the system, must not exceed $\pm E_b$. When a digital feedback loop in accordance with this invention is added to such a system, the phase error angle can at all times be maintained at an angle less than $\pm\delta\phi$, corresponding to a phase error voltage $\pm\Delta E$, as determined by the threshold voltage of the voltage discriminators 9 and 10 as earlier explained. In other words, the operating point of the improved system will remain at all times on the small segment of the curve indicated by a double line in FIG. 8. The system will then be able to accept noise and disturbance voltages of a greatly increased value, as indicated by the difference $(E_d-\Delta E)$, before incorrect operation is liable to set in.

In a practical embodiment of the system, using the set-up shown in FIG. 5, the prescribed maximum voltage error $\Delta E$ was selected so as to correspond with a frequency deviation of ±80 c.p.s. With a total random frequency spread of about ±5000 c.p.s. in the signals received from a satellite, it was desired to maintain the phase error at the lowest possible value. This involved maintaining the phase error $\delta\phi$ at a value less than 80/5000 radians, or somewhat less than 1 angular degree. The result was effectively accomplished using a reversible counter 30 having seven binary stages. With a counter having *n* binary stages ($n8$) the phase error could be less than the figure earlier computed. In fact, the phase error is $\Delta\gamma\simeq 1/2n$ and it could be reduced to any required value.

Among the advantages of the digital feedback loop used in the invention, is the important feature that the digital generator means constitute, in effect, an "infinite-memory" integrating device, in the sense that the voltage level attained by the counter output at any particular time will be retained unchanged over indefinite periods of time. This contrasts with the imperfect memory that would be constituted by an analog storage or integrating circuit, wherein the output, generally in the form of a condenser charge, leaks off at a slow yet appreciable rate. Another important advantage is the fact that the digital memory of the invention does not introduce a phase lag into the feedback signal, as would be the case with an analog integrator. Stability of the servo-system is therefore not impaired.

What I claim is:

1. An angle-lock signal processing system comprising:
a phase discriminator connected to have an incident signal applied to one input and a reference signal applied to its other input and delivering an error signal of one kind in response to angular deviations of the incident signal in one sense and an error signal of other kind in response to angular deviations of the incident signal in opposite sense from the reference signal;

a variable-frequency oscillator having a frequency-varying input and having its output connected to vary the angle of said incident signal; and dual feedback means connected between the phase discriminator output and the frequency-varying input of the oscillator said dual feedback means including:

digital means including a phase generator having a control input connected to the phase discriminator output said digital means producing an incremental variation in output in one sense in response to an error signal of one kind greater than a prescribed level and producing an incremental variation in output in one sense in in response to an error signal of the opposite kind greater than a prescribed level the rate of said incremental variations being determined by the pulse rate of said generator, including means applying the output of said digital means to said frequency-varying input of the variable oscillator, an integrating network connected in parallel with said digital means between the phase discriminator output and said frequency-varying input.

2. The system claimed in claim 1, further comprising means for receiving a signal, and means for heterodyning said received signal with the output of said variable oscillator to provide said incident signal.

3. The system claimed in claim 1, including means for controlling the digital means to produce increment output variations in a single one of said two senses during a "search" mode of operation of the system.

4. The system claimed in claim 1, wherein said digital means comprises: two voltage discriminators having inputs connected to the phase discriminator output and producing respective output signals in response to error signals of positive and negative polarity exceeding a prescribed threshold level, and digital generator means having two control inputs connected to the outputs of the respective voltage discriminators, said generator means producing a staircase-like voltage waveform on occurrence of an output signal from either of said voltage discriminators, and logical circuit means connected to control the generator means to cause said output waveform therefrom to increase in one sense on occurrence of a signal at one control input and increase in the opposite sense on occurrence of a signal at said other control input.

5. The system defined in claim 4, wherein the voltage discriminators each include an amplifier stage connected to receive the error signal, the amplifier stages of the respective voltage discriminators being operative only to amplify error signals of positive and negative polarity respectively, and a trigger stage connected to receive the amplified error signal and produce an output signal of fixed magnitude when the amplified error signal exceeds a prescribed threshold magnitude.

6. The system claimed in claim 4, including an automatic gain control circuit connected in the path of said incoming signal and means for controlling the digital means to produce incremental output variations in a single one of said two senses during a "search" mode of operation of the system, said last means comprising a switching device connected from the output of said automatic gain control circuit to one of said control inputs of the digital generator means for applying a signal to said one control input in the presence of a high noise output from said automatic gain control device.

7. The system defined in claim 4, wherein the digital generator means comprise two separate digital generators each having a respective one of said control inputs associated therewith, and differential amplifier means for algebraically combining the outputs of both generators.

8. The system defined in claim 4, wherein the digital generator means comprise a single, reversible digital generator and said logical circuit means is operative to reverse the operation of said generator.

9. In a signal system, an error signal developing comprising in combination means delivering an error voltage of reversible polarity, threshold circuit means connected to receive the error voltage and having a pair of outputs one of which is energized when the error voltage is positive and exceeds a prescribed threshold value and the other of which is energized when the error voltage is negative and exceeds a prescribed threshold value in absolute magnitude, a pulse generator, multistage scale-of-two counter means connected to receive a pulse train from said pulse generator and producing rectangular waveforms at the outputs of the respective counter stages having cycle periods in a geometric progression of ratio 2, summing means connected to said stage outputs for producing a staircase-like resulting output waveform, control input means connected to said counter means and selectively energizable to control the counter means to produce a staircase-like output waveform which increases in either one of two opposite senses, and logical circuitry connected to said control input means and the respective outputs of said threshold circuit means, whereby to produce an incrementally varying waveform at the output of said counter means which increases stepwise when said error voltage is of one polarity and exceeds said threshold value and decreases stepwise when said error voltage is of opposite polarity and exceeds said threshold value in absolute magnitude, and said waveform retaining a fixed level when said error voltage is less than said threshold value, an integrating network having an input connected to receive said error voltage and produce an integrated voltage output; and means connected to the output of the counter means and the output of the integrating network for combining said staircase-like wave form output and said integrated voltage output into a common composite error signal.

10. The combination claimed in claim 9, wherein said summing means comprises a set of impedances connected to the stage outputs, and having values substantially corresponding to the terms of said geometric progression.

11. The combination claimed in claim 10, wherein said counter means comprises a multistage scale-of-two counter having its first stage connected to said pulse generator, and the logical circuitry includes gating means connected between adjacent counter stages whereby to reverse counting operations.

References Cited

UNITED STATES PATENTS

| | | | |
|---|---|---|---|
| 2,982,921 | 5/1961 | Rozner et al. | 331—17 |
| 3,223,943 | 12/1965 | Dumaire et al. | 331—17 |
| 3,275,940 | 9/1966 | Kahn | 331—17 |
| 3,290,611 | 12/1966 | Horlacher et al. | 331—17 |

JOHN KOMINSKI, *Primary Examiner.*